United States Patent [19]
Merryfull

[11] Patent Number: 5,109,920
[45] Date of Patent: May 5, 1992

[54] METHOD OF MANUFACTURING HEAT EXCHANGERS

[75] Inventor: Albert E. Merryfull, St. Ives, Australia

[73] Assignee: Ice-Cel Pty. Limited, Australia

[21] Appl. No.: 439,384

[22] PCT Filed: May 25, 1988

[86] PCT No.: PCT/AU88/00159
§ 371 Date: Jan. 2, 1990
§ 102(e) Date: Jan. 2, 1990

[87] PCT Pub. No.: WO88/09261
PCT Pub. Date: Dec. 1, 1988

[30] Foreign Application Priority Data
May 25, 1987 [AU] Australia ............................ PI 2096

[51] Int. Cl.⁵ .............................................. F28D 1/04
[52] U.S. Cl. ................................ 165/163; 29/890.03; 165/162; 126/400
[58] Field of Search ................ 29/428, 890.03, 890.53; 264/285, DIG. 40; 165/10, 162, 163, 145; 126/400

[56] References Cited

U.S. PATENT DOCUMENTS

| | | | |
|---|---|---|---|
| 908,465 | 1/1909 | Jett | 165/163 X |
| 2,450,324 | 9/1948 | Wilson et al. | 264/DIG. 40 X |
| 2,528,528 | 11/1950 | Lyon | 264/DIG. 40 X |
| 3,411,574 | 11/1968 | DeVries et al. | 165/163 X |
| 3,499,484 | 3/1970 | Lanzoni | 165/163 X |
| 4,014,314 | 3/1977 | Newton | 126/271 |
| 4,074,958 | 2/1978 | Molenaar | 425/71 |
| 4,167,211 | 9/1979 | Haller | 165/78 |
| 4,191,304 | 3/1980 | Schiedat | 220/414 |
| 4,349,490 | 9/1982 | Bos | 264/25 |
| 4,422,999 | 12/1983 | Mitchell | 264/339 |
| 4,605,059 | 8/1986 | Page | 165/163 |
| 4,616,390 | 10/1986 | MacCracken | 29/157.3 R |
| 4,671,347 | 6/1987 | MacCracken | 165/10 |

FOREIGN PATENT DOCUMENTS

| | | | |
|---|---|---|---|
| 1408823 | 10/1975 | United Kingdom . | |
| 2075172A | 11/1981 | United Kingdom | 165/163 |

*Primary Examiner*—Allen J. Flanigan
*Attorney, Agent, or Firm*—Marshall & Melhorn

[57] ABSTRACT

This invention relates to an improved method of manufacturing a heat exchanger element. In a second aspect the invention concerns a heat exchanger element itself. In the third aspect the invention concerns a reservoir suitable for housing the heat exchanger element to form a heat exchanger. The element is manufactured by extruding polyethylene tubes and winding them into spiral coils. Each coil is located along the length of a rigid horizontal spacer bar in order to maintain even spacing of the coil. The element comprises a stack of coils which are not restrained against vertical movement. The element also comprises a cylindrical void through the center.

20 Claims, 6 Drawing Sheets

METHOD OF MANUFACTURING HEAT EXCHANGERS

TECHNICAL FIELD

This invention relates, in a first aspect, to an improved method of manufacturing a heat exchanger element. Such elements are employed in heat exchangers, for instance of the kind used in cooling and heating systems for buildings. In a second aspect this invention concerns such a heat exchanger element itself, and a heat exchanger employing the heat exchange element. In a third aspect this invention concerns a reservoir suitable for housing the heat exchanger element to form a heat exchanger.

BACKGROUND ART

Known heat exchangers, of the kind used in cooling and heating systems for buildings, generally comprise a reservoir filled with a phase-change medium through which a plurality of parallel heat exchange circuit pass. The phase-change medium is usually aqueous-based and changes between water and ice in order to store and release coldness. Typically the tubes which comprise the heat exchanger element are disposed in coiled formations extending between an inlet manifold and an exhaust manifold.

A known heat exchanger element includes vertically disposed spacer elements which maintain the relative positions of the coils one above the other. The tubes are spaced closely together and their forward flow portions are interspersed with their return flow portions in order to minimise the temperature gradient throughout the phase-change medium. In this way ice is intended to form simultaneously throughout the phase-change medium and displace water upwards, thus preventing any build-up of pressure against the walls of the reservoir. However, in practice reservoirs are often constructed from flexible materials in order to accommodate some degree of expansion.

Heat exchange elements have customarily been made by winding plastics tubing into coils. This is a slow and cumbersome operation and it is almost impossible to wind coils with even spacing and without crushing or kinking the tubing. Uneven spacing leads to the appearance of temperature gradients in the phase-change medium, and kinking causes unacceptable pressure drops through the coils. In addition, the plastic tubing is taken from spools, each of which may hold, say, a 100 meters of tubing, and the tubing has a memory set into it which causes a tendency for it to resume the coiled shape in which it was wound on the spool. This tendency makes it even more difficult to wind the tubing into the coils required for the heat exchanger element, and also makes it very difficult to maintain the tubing coiled in the required configuration.

A further problem encountered in the manufacture of heat exchangers is that the elements are required to be rigidly restrained within the reservoirs in order to prevent movement resulting from their buoyancy. The restraint has to be sufficiently strong to survive the commissioning of the heat exchangers, when water is often pumped into the reservoirs without close supervision.

There are many other problems associated with known heat exchangers and heat exchanger elements and their manufacture. For instance it has proven difficult to pressure test the parts of the assembly during construction which has led to the need for expensive pre-commissioning testing.

DISCLOSURE OF INVENTION

According to a first aspect of the present invention, there is provided a method of manufacturing a heat exchanger element comprising the steps of:

(a) extruding a tube of deformable plastics material;

(b) winding the tube prior to curing to form a continuous spiral of tubing lying substantially in a plane;

(c) engaging the spiral of tubing along the length of at least one spacer bar in order to maintain the tubing in the spiral configuration;

(d) disposing a plurality of spirals of tubing one above the other; and (e) arranging one end of each spiral in communication with an inlet manifold and the other end in communication with an outlet manifold.

The tube may be made of PVC or nylon or any other suitable material, but is preferably extruded from polyethylene pellets.

The tube is quenched before being wound, and the winding preferably takes place on a winding table while the tube is at a temperature of, say, between 40° and 60° C.

The spacer bar preferably extends in a radial direction and is notched along its length with notches of a size suitable to locate the outer diameter of the tubing. Once a complete spiral of tubing has been engaged in the notches along a spacer bar, a locking bar may be clipped over the top, closing all the notches and thus allowing the spiral to be removed from the winding table and handled with ease. Preferably the locking bar initially engages the spacer bar in a manner which allows some adjustment of the tubing, and is subsequently driven into an irreversible engagement which does not permit further movement of the tubing.

The spacer bars are preferably splayed on their underside in order to provide some load spreading.

The spirals are subsequently placed on a rigid platform, around the edges of which rods extend in an upward direction in order to restrict lateral movement of the spirals. A second rigid platform is connected to the tops of the rods in order to provide a transportable structure.

The spirals are preferably wound alternately clockwise and anti-clockwise, and arranged in pairs one above the other. The inner ends of each pair are connected together, the outer end of the lower spiral being connected to the, inlet manifold and the outer end of the upper spiral being connected to the outlet manifold in order to create one circuit. This has the advantage that the heat exchange fluid flows in the same direction through both spirals, and thus the circuit does not experience the pressure drop associated with a change of direction.

A heat exchanger may be manufactured by placing an element constructed in the manner outlined above in a reservoir and then securing it to the reservoir, preferably at the bottom.

The reservoir is preferably constructed with an inner and outer fibre-glass skin sandwiching a layer of thermally insulating material.

According to a second aspect of the present invention there is provided a heat exchanger element of the type which exchanges heat between a fluid circulating in the element and a phase-change medium in a reservoir, the element comprising: a plurality of flexible tubes each arranged in a substantially planar spiral, each spiral substantially disposed horizontally one above the other, the tube forming each spiral being engaged along the length of at least one respective substantially horizontal spacer bar in order to maintain that tube in the spiral configuration, but the individual spirals being not constrained by any rigid means against vertical movement with respect to the spirals above or below; and one end of each spiral being in communication with an inlet manifold and the other end in communication with an outlet manifold.

Preferably there is void at the centre of each spiral such that a cylindrical void, coaxial with the spirals, is created throughout the centre of the element.

Preferably the flexible tubes are made of polyethylene because of its thermal and chemical stability, and mechanical strength. However, the tubes may be made from PVC or nylon or any other suitable material.

The spacer bars advantageously extend radially with respect to each spiral, and are notched along their length with notches of a size commensurate with the outer diameter of the tubes. A locking bar advantageously engages the top of each spacer bar and prevents the tubes from being dislocated. The bottoms of the spacer bars are splayed in order to provide some load-spreading.

The element is preferably supported on a rigid platform. Vertical rods extend from around the edge of the platform and connect with a second rigid platform placed above the element to create a rigid cage containing the flexible tubes. The inlet and outlet manifolds are preferably disposed vertically up the side of the element.

The spirals are preferably wound alternately clockwise and anti-clockwise, and arranged in pairs one above the other. The inner ends of each pair are connected together, the outer end of the lower spiral being connected to the inlet manifold, and the outer end of the upper spiral being connected to the outlet manifold. In this way the heat exchange fluid flows in the same direction, either clockwise or anti-clockwise, in both the spirals. Also the connection between the two spirals need not be sharply angled, and could even be straight. Thus the pressure drop associated with sharp changes in flow direction is avoided. In addition less stress is placed on the tubing and interconnections.

In elements having a large diameter, it may be advantageous to have two or more concentric spirals in each layer, in order to reduce the pressure drop from inlet to outlet. In order to accomplish this, a pair of spirals may be wound and then cut midway along their length. The outer portions of the pair of spirals are connected as before; and the inner ends of the inner portions are connected together, and the cut ends of the inner portions are connected to the inlet and outlet manifolds such that the flows in the inner and outer portions of each spiral are counter-directional. However, flow is maintained in the same direction throughout the pair of outer portions and also throughout the pair of inner portions, and all the advantages discussed above in relation to maintaining flow in the same direction throughout each circuit are preserved. Furthermore, the counter-directional flows in the inner and outer portions of each spiral serve to neutralize any gyroscopic effect generated by unidirectional flow of the heat exchange fluid.

A heat exchanger may comprise a reservoir preferably of rigid construction and having parallel walls into which an element as described above is secured.

Such a reservoir is preferably made from fibre-glass, and the element is preferably secured to the bottom of the reservoir.

According to a third aspect of the present invention, there is provided a rigid reservoir suitable for housing a heat exchanger, the reservoir having parallel vertical walls, and comprising an inner and an outer fibre-glass tank, placed one inside the other and separated by thermally insulating material, the outside of the inner tank being banded with convex rings of reinforcement.

The bottom of the outer tank is advantageously recessed in the centre and a piece of marine plywood is positioned between this recess and the inner tank. Also a circular ripple suitable for locating an O-ring may be moulded into the interior surface of the bottom of the inner tank above the piece of marine plywood. In this way a hole may be drilled from the outside to the inside of the reservoir through the marine plywood while still sealing the bottom of the reservoir against the escape of its contents.

The convex rings are preferably C-shaped in section.

The meeting between the sides and bottom of each tank are preferably radiused.

A sealing ring is advantageously located over the tops of the sides of the tanks and seal them.

The thermally insulating material is preferably expanded polystyrene which extends throughout the space between the walls and bottom of, the talks except for the space occupied by the marine plywood.

BRIEF DESCRIPTION OF THE DRAWINGS

The invention will now be described by way of example and with reference to the accompanying drawings in which.

BEST MODES FOR CARRYING OUT INVENTION

Figure 1:
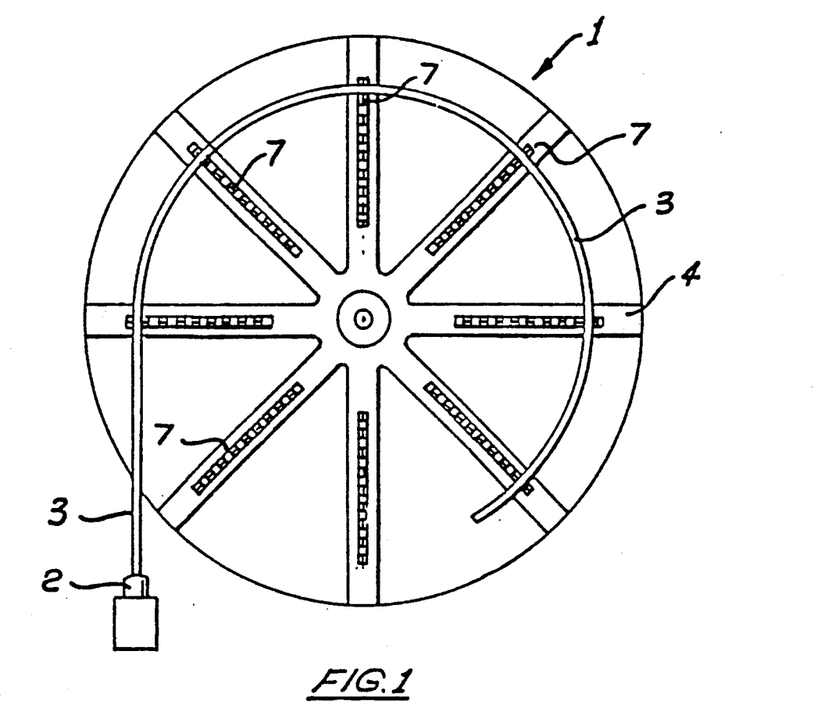
FIG. 1 is a plan view of an apparatus which may be used in the method of the first aspect of the invention to form a heat exchanger element embodying the second aspect of the invention.

Referring to FIG. 1 a rotatable turntable 1 is positioned adjacent to a nozzle 2 which feeds continuous tubing 3 from a plastics extruder onto the turntable. The top side of the turntable has a series of radially extending aluminium sections 4 dimensioned appropriate to the maximum diameter of coil design to be wound; typically about 3 meters diameter.

Figure 2:
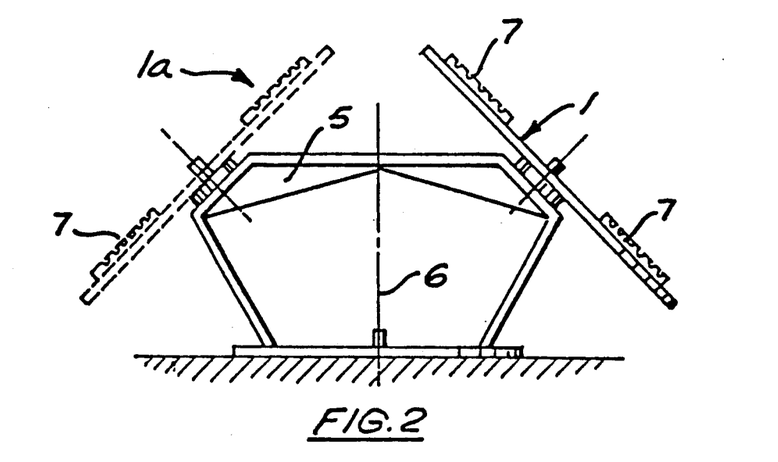
FIG. 2 is an elevation of a pair of the apparatus of FIG. 1.

FIG. 2 shows a side elevation of the turn-table of FIG. 1, and also illustrates that it is tilted with respect to the horizontal. Turntable 1 is mounted on a carriage 5 together with a second turntable 1a, and the entire arrangement is rotatable about vertical axis 6 in order to allow uninterrupted operation of the extruder.

Figure 3:
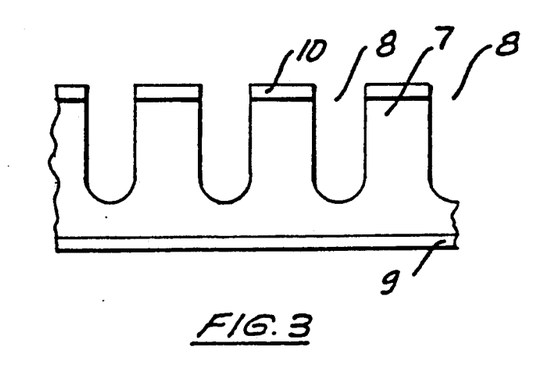
FIG. 3 is a side elevation of a spacer bar used in a heat exchanger element embodying the present invention.
Figure 4:
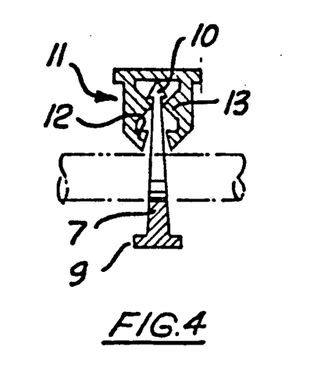
FIG. 4 is an end elevation of the spacer bar of FIG. 3, and also shows a clip bar used in a heat exchanger embodying the present invention.

Prior to winding the tubes 3 spacer bars 7 are clipped into the top of aluminium sections 4 in order to provide guides for the tubes. The spacer bars 7 are illustrated in FIGS. 3 and 4. They can be seen to be notched along their length with notches 8 having a length commensurate with the outer diameter of tubing 3. The bottom of the spacer bars is splayed in the region 9 in order to provide some load-sharing, and the top of the upright section between the notches is barbed 10.

In use, polystyrene pellets are melted in an extruder and extruded at about 600° C. into quenching baths and then fed to nozzle 2 before being wound onto winding table 1. The tubes are wound into the notches of the spacer bars 7 from the outside inward and are laid down at a temperature between 40° C. and 60° C., that is before the plastic material has cured. This causes that the plastic tubing cure into the spiral shape required. Once an entire spiral has been wound onto winding table 1, the tubing is cut. The next spiral may be laid down on the other winding table 1a immediately, and is wound in the counter direction.

Once a complete spiral has been laid onto the spacer bars 7 a locking bar 11 is clipped onto the top of each bar in order to prevent the loops of the spiral from becoming dislocated from the notches. Locking bar 11 is shown in section in FIG. 4 and has two sets of barbs 12 and 13. At this stage only the lower set of barbs 12 are engaged with the barbs 10 of the spacer bars. Once all the locking bars are in place, it is possible to handle the spiral of tubing as a whole without spoiling the configuration, but some movement of the tubing with respect to the spacer bars is possible. Preferably there are six or eight radially arranged spacer and locking bar assemblies to each spiral. The spirals are not completed to the centre, or axis, but are stopped short leaving a void having a diameter of say between a tenth and a quarter of the diameter of the spiral.

Once the clip bars are fitted, the wound spiral is lifted off the winding table 1 and laid on a solid surface. The clip bars are then driven home to the second barbs 13. Once the clip bars are engaged to the second barbs, the whole spiral assembly is solid and will not permit any slippage of the coil in the clip bar assembly.

Figure 5:
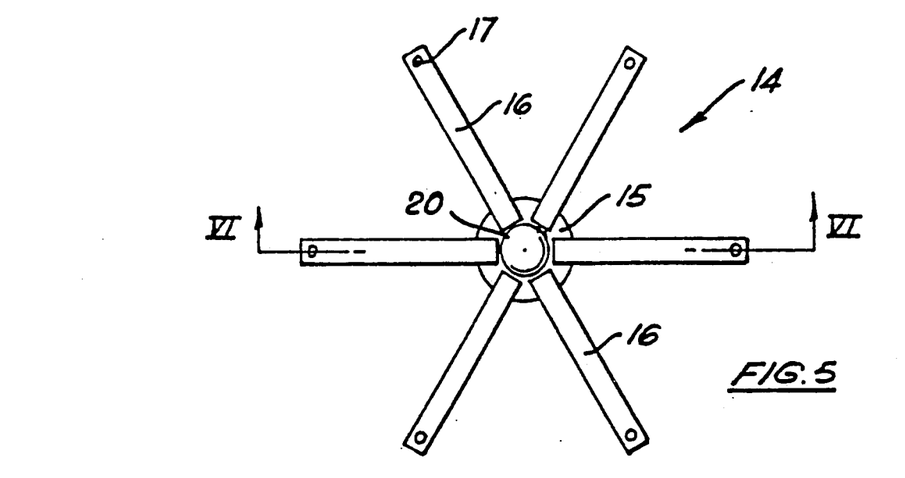
FIG. 5 is a plan view of a platform used in a heat exchanger embodying the present invention.
Figure 6:
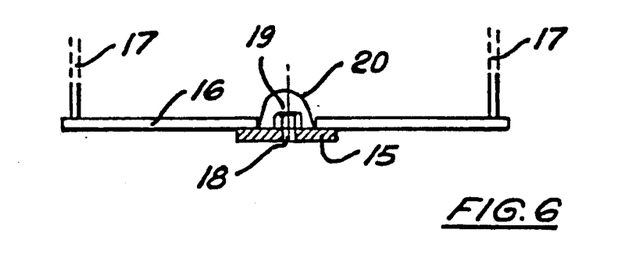
FIG. 6 is a sectional view of the platform shown in FIG. 5, along the line VI—VI.

The spiral is then picked up and placed on a bisket 14 as shown in plan view in FIG. 5.

Bisket 14 comprises a solid central disc 15 on which are mounted arms 16 of steel (or other suitable material) to provide a platform support onto which the spiral may be placed. Vertical rods 17 extend from the distal ends of the arms 16 in order to provide a restraint against lateral movement of the spirals. Central disc 15 is penetrated by a central hole 18 at the top of which is secured a nut 19 over the top of which is secured a dome 20. Sufficient space is allowed between the top of nut 19 and the dome 20 for the insertion of the end of a bolt.

Each alternate spiral laid onto bisket 14 is wound in the opposite direction. The inner ends of each pair of spirals are brought together and joined to comprise one complete supply and return flow circuit.

The tubes may conveniently be joined with U-bends or gently curving, or even straight, elbows 21 of plastic material such as nylon; alternatively they may be made of metal. The tube joiners are sealed to the tubes using peripheral compression clips 22 which may be made of plastic or metal, but preferably a plastics ratchet clip is used which provides a full circular compression. The type of clips which have a small flat section should be avoided since they permit frost and ice to form at the ends of the flat section between the clip and tube, and that can lead to ice heave damaging the tubes and causing leakage.

The outer ends of the spirals of the pair forming each circuit are connected to an inlet 23 and outlet 24 manifold.

Figure 7:
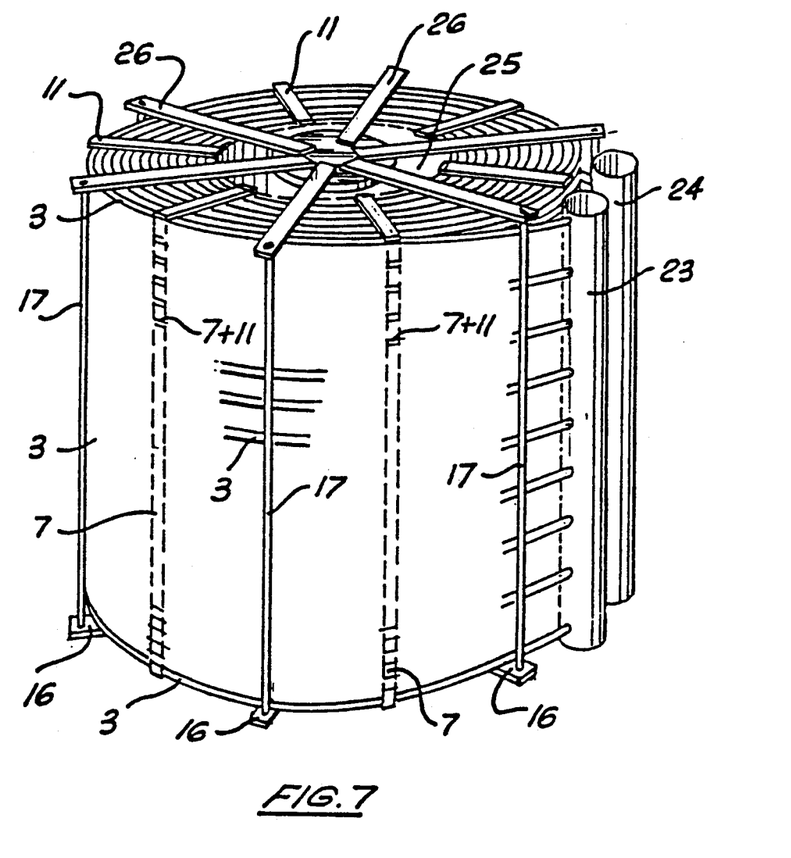
FIG. 7 is a perspective view of a heat exchanger element embodying the present invention in association with a cage.

Many circuits are stacked one above the other to form a hollow cylindrical heat exchanger element having a void 25 along the axis. The weight of the element may be sufficient to crush some of the lower spirals, e.g. 1200 kg or more, so it is essential that the spacer bars do not have narrow undersides, but are able to distribute the load on the lower spirals. The top of the element is finished with a second bisket 26 attached to the top of the upright rods 17. In some larger elements, which may be for instance 3 meters tall or more, intermediate biskets may be employed in the structure to provide additional stability.

Before going on to describe how a complete heat exchanger is constructed using one of these elements, some preferred arrangements of the circuits of tubing will be described.

Figure 8:
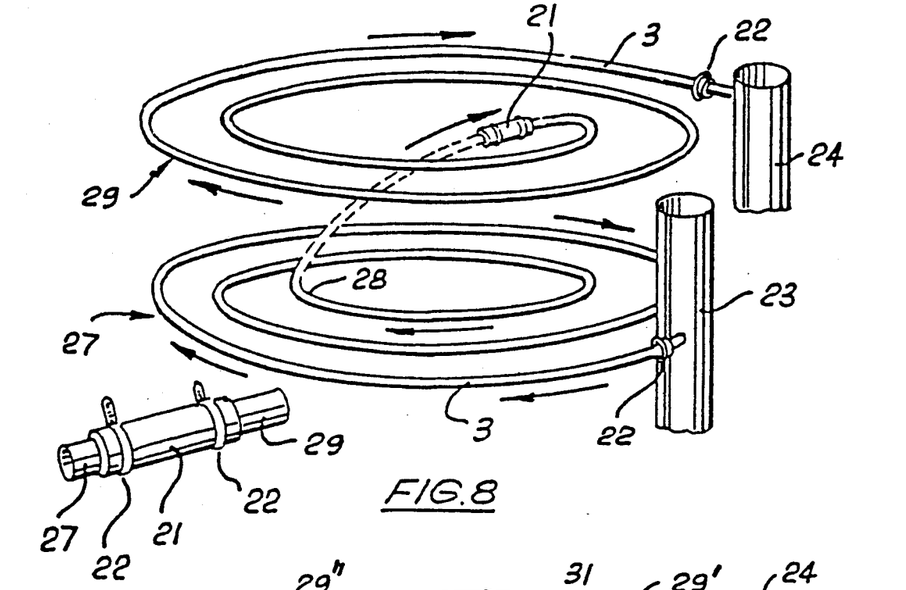
FIG. 8 is a schematic illustration showing the direction of flow of heat transfer medium through a circuit of a heat exchanger element embodying the present invention.

Referring now to FIG. 8, inlet manifold 23 is connected to a clockwise wound spiral 27 of tubing which, at its inner end 28 is connected to the spiral directly above. The upper spiral 29 is wound anti-clockwise and communicates with the outlet manifold 24. It is advantageous to arrange the outlet of the circuit higher than the inlet so that any air is automatically swept from the tubing as it is filled, and gas is kept clear of the tubing as it is used. In this circuit the flow enters the lower spiral 27 in a clockwise direction, flows around to the inner end 28 of the spiral then rises up to the upper spiral 29 and continues flowing in a clockwise direction as it moves outwards to the outlet manifold 24.

Figure 9:
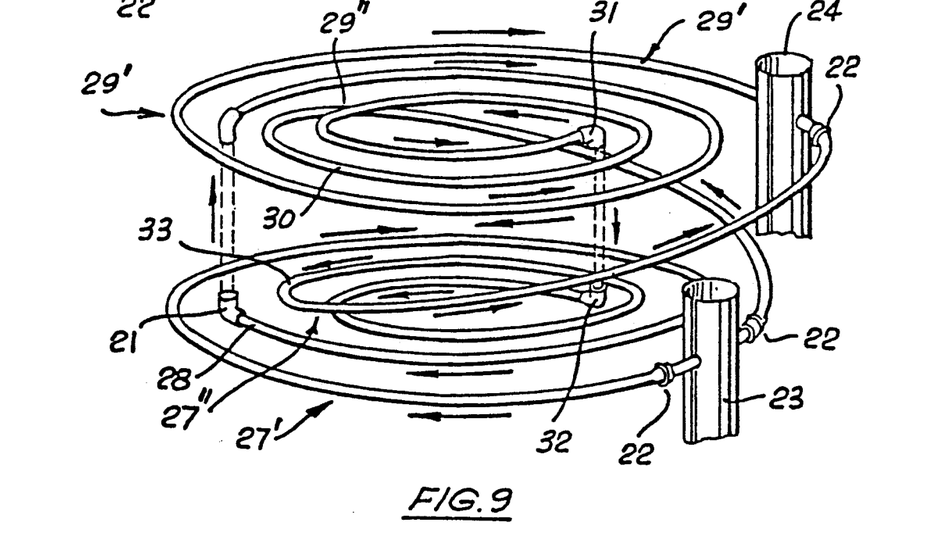
FIG. 9 is a schematic illustration of an alternative direction of flow of heat transfer medium through a circuit of an element embodying the present invention.

FIG. 9 shows an alternative embodiment preferred in large diameter elements. In this case the spirals are cut into two once they have been removed from the winding table, the cut being approximately half-way along the length of the tube comprising the spiral. In this case the outer portions, 27' and 29', of each spiral are connected as shown in FIG. 8 but the inner portions, 27" and 29", are connected to permit flow in the opposite direction. Flow from inlet manifold 23 enters the outer edge of the inner spiral 30 of the upper layer, travels anti-clockwise around to the inner end 31 of the spiral then down to the inner end 32 of the lower spiral and anti-clockwise out to the outer end 31 of the inner portion from which it returns directly to the outlet manifold 24. This arrangement has the advantage that, by reducing the length of each circuit, unnecessarily large pressure drops (i.e. above 60-70 kPa) are prevented from occurring.

Figure 10:
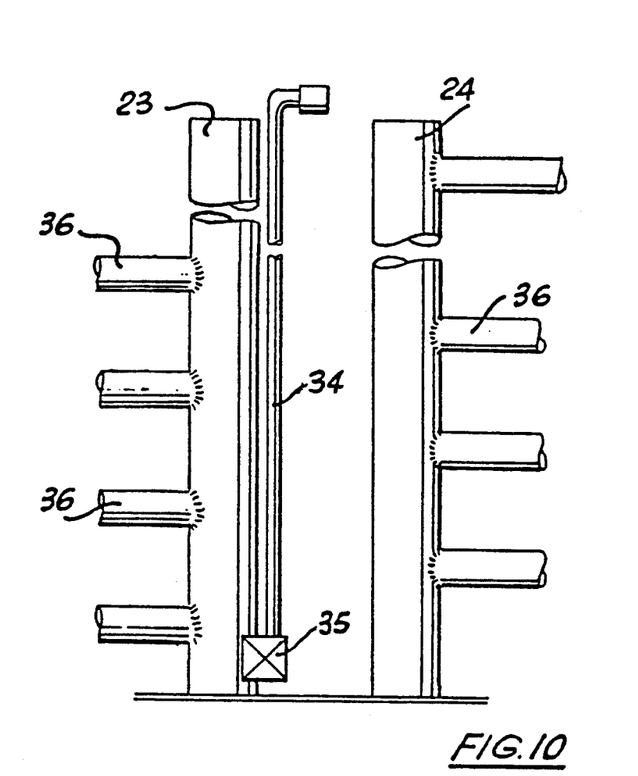
FIG. 10 is a schematic illustration of the manifolds of a heat exchanger embodying the present invention, including a pump-out facility.

The manifolds situated at the radially outer edge of the assembly are connected to many parallel circuits, and it is therefore not possible to pump or blow the assembly dry, since as soon as the first few circuits were emptied they would provide a by-pass for any applied pressure. Therefore a pump-out facility is provided which essentially comprises a stand pipe 34 connected to the bottom of the inlet manifold 24 through a foot or check valve 35, as shown in FIG. 10. This allows an external positive displacement pump to empty the element.

Figure 11:
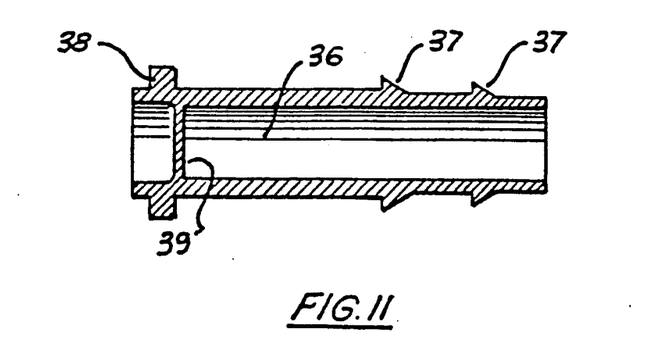
FIG. 11 illustrates the construction of the spigots attached to the manifolds of FIG. 11.

It will be seen that the manifolds are very complicated structures having many spigots 36 connected along the length of the pipe. The pipe may be manufactured from copper tube, and the spigots are typically of brass. Alternatively, the manifolds may be fabricated from plastic materials. The spigots 36 consist of hollow tubes having hose retaining barbs 37 circumferentially disposed at one end on the outer surface whereby the spigots are adapted for connection to the tubing. The spigots are also provided with a flange or shoulder 38 adjacent the other end, whereby the spigot is adapted to be inserted as a push fit into a hole drilled through the side wall of the manifold tube, with shoulder 38 abutting the manifold wall. The spigots are then soldered or welded or otherwise connected to the manifold. The spigots are provided with an internal membrane or wall closure 39.

In practice, the spigots are welded to the manifolds and the manifolds are then pressure tested to ensure adequate welding. This is necessary because of the enormous expense involved in de-commissioning and dismantling an assembled or part-assembled element in order to mend a leak. If all the welds are satisfactory, the membranes 39 of adjacent spigots are drilled out, and the tubing of a pair of spirals is connected to these adjacent spigots. The joints are then pressure tested for leaks, and so on.

Figure 12:
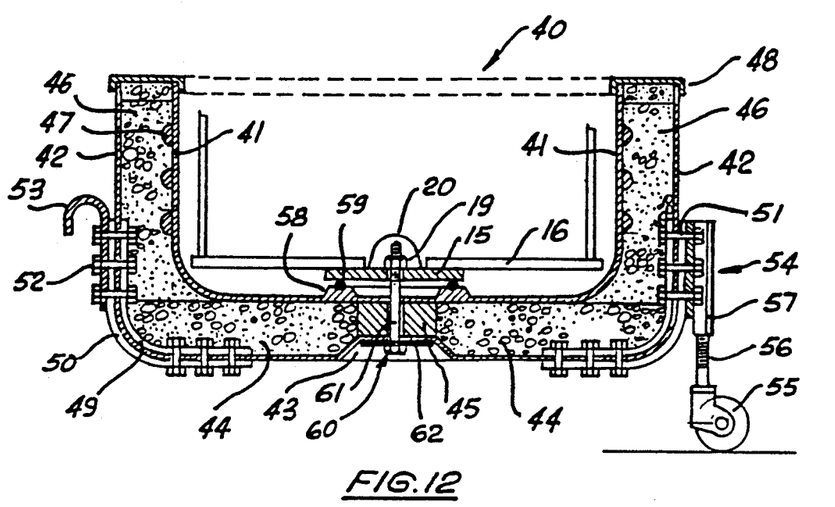
FIG. 12 is a sectional view of a reservoir used in a heat exchanger according to an embodiment of the present invention.
Figure 13:
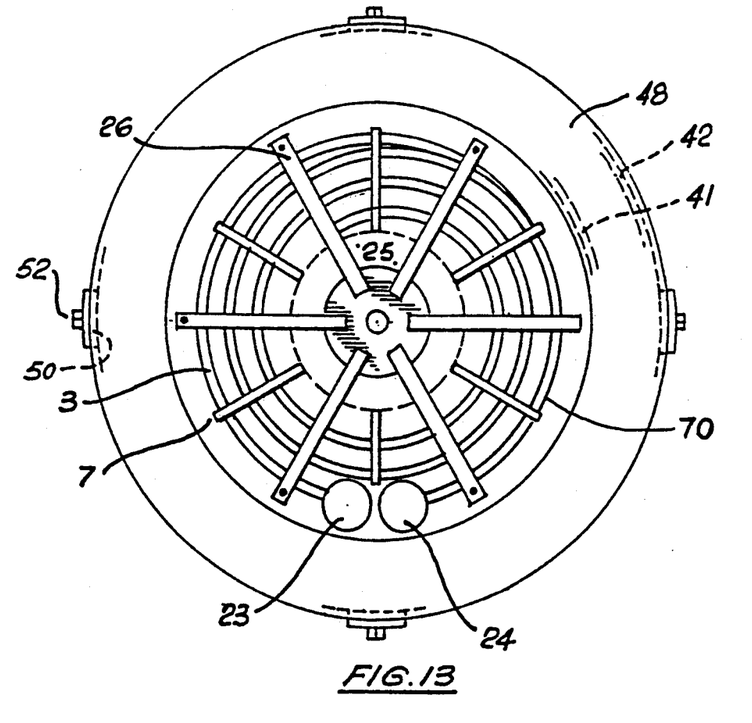
FIG. 13 is a plan view of a heat exchanger embodying the present invention.

A reservoir suitable for housing a heat exchange element will now be described with reference to FIG. 12.

The heat exchanger reservoir comprises an inner fibre-glass tank 41 and an outer fibre-glass tank 42, both preferably circular in plan view. The tanks are preferably made in two halves so that the walls may be substantially vertical and parallel, the halves being connected together with fibre-glass matting in known manner.

A region 43 in the centre of the outer tank is recessed inward. A disc-shaped platter 44 of expanded polyurethane foam is placed in the bottom of the outer tank extending from the walls to the recess. A block of marine plywood 45 is placed above the recess. The inner tank 41 is then placed in the outer tank 42. Polyurethane foam 46 is then expanded into the cavity between the walls of the inner and outer tanks.

The outer walls of the inner tank are banded with C-shaped section reinforcement bands 47 to prevent deformation of the tank when the polyurethane foam is expanded into the wall cavity. A sealing ring 48 closes the top of the cavity between the inner and outer tank.

In this manner a rigid thermally insulated reservoir is constructed, capable of being filled with water or other heavy liquid.

Preferably, four metal brackets are secured inside 49 and outside 50 the outer tank 42 where the walls meet the floor. The inner and outer brackets are bolted to each other through the wall of the tank by means of bolts 51 and nuts 52. The bolts 51 enable hooks 53 to be secured to the outside of the tank so that the tank may be lifted by a crane, or, alternatively allow a wheel assembly 54 to be connected to the outside of the tank to allow it to be pushed along. The wheels 55 of the wheel assembly are preferably mounted on a threaded member 56 which extends through a sleeve 57 so that the wheels may be wound down into engagement with the ground after the assembly 54 has been connected to the reservoir. These transporting fixtures are necessary because a complete heat exchanger, when empty, may weigh up to 1700 kg or more.

The inner tank is preferably formed with a ripple of fibre-glass 58 concentric with its axis, and onto which an O-ring 59 may be embedded with a generous application of silicon or other suitable sealing, non-hardening material. A hole 60 may then be drilled through the centre of the bottom of the tank, a heat exchanger element may then be lifted and lowered into the tank, and a three quarter inch steel bolt 61 may be inserted through hole 60 and screwed into the nut 19 mounted in the bisket assembly at the bottom of the element, and tightened. In this way the bolt 61 maintains the element firmly secured to the bottom of the reservoir. The O-ring 59 seals against the central disc 15 of the bisket and prevents phase-change medium from leaking out through the hole 60. A heavy galvanized steel plate 62 may be glassed into the base of the outer tank to provide added strength.

A top of similar construction to the rest of the reservoir is preferably provided in order to finish the heat exchanger.

Experience has shown that the larger the heat exchanger, the more cost effective it is to manufacture and use. Therefore it is desirable to make exchangers up to, say, 3 meters in diameter and 3 meters height. Such a heat exchanger may have a thermal storage capacity in excess of 1200 kilowatt hours.

Once a heat exchanger has been installed in the desired location, it is commissioned for use. This preferably involves a careful filling of the reservoir with phase-change medium and a simultaneous filling of the element with heat exchange fluid. However, it has been found that the proper commissioning procedures are often not followed and the reservoir may be filled, say, with water from a fire hose under little or no supervision. Unless the tubes of the element are filled concurrently with the reservoir the element becomes buoyant and may generate an upward thrust in the region of several thousand kilograms, thus the necessity for the three quarter inch steel bolt 61. Once the heat exchanger is fully commissioned, the density of the phase-change medium is approximately equal to the combined density of the tubes and heat exchange fluid so the element only experiences small upward or downward thrusts. A particular feature of the heat exchanger element is that there is no restraint on vertical movement of the spirals, other than the top bisket and the connections to the manifold. There is also some additional restraint from the interconnection between the pairs of spirals forming each circuit but generally the spirals are free to float and find their own level in the phase-change medium.

The phase-change medium is preferably an aqueous-based salt solution having a density of between one and two times the density of water. The heat exchange fluid is preferably a glycol/water solution.

In order to store coldness, cold heat exchange medium is pumped into the inlet manifold and exhausted through the outlet manifold. At the beginning of the process all the sensible heat is removed from the phase-change medium around the element, cooling it to its freezing temperature. Further cooling causes the formation of ice particles around the spirals, ice forming first where the tubes are nearest the inlet manifolds. However, the tubes themselves are somewhat thermally insulating and, as a result of the constant horizontal spacing, ice forms substantially simultaneously throughout the element. As ice forms on the outer surface of a tube of the element it insulates that tube and slows down the production of more ice on it, thus ensuring an even build-up of ice throughout the element. The build-up of ice displaces water from around the spirals and also pushes apart those spirals which are close to those above or below them. Thus the freezing process automatically regulates the vertical distribution of spirals in the element and maintains a constant separation between them. Expansion of the ice is controlled to take place in a substantially vertical direction and not horizontally, so that there is no extra pressure exerted on the walls of the tank which may consequently be made of a rigid material.

Once the phase-change medium around the element is fully frozen there are still two liquid regions: the cylindrical column at the centre of the element, and the cylindrical body of water around the exterior of the element, between it and the reservoir walls. If the tank is cooled below the point where all the phase-change medium surrounding the element is frozen, the remaining sensible heat is extracted from the central column of liquid phase-change medium, and further cooling freezes this column. This freezes from the bottom to the top and it can be seen that in an over-charged tank there is a hump in the level of ice in the central region where there are no tubes.

The freezing of the central column provides an ideal condition for accurately determining a true ice build condition, and thus a true termination condition can be selected with ease.

The capacity of a thermal storage device as described can be made to vary, depending on the requirements, by using more or less tubing in the element. This can be achieved by simply reducing or increasing the number of vertical circuits, or by changing the horizontal spacing and using spacer bars with different spacings. This is easily done since the spacer bars may be manufactured blank and the notches punched out of them at a later date.

In some applications, it may be necessary to include a supplementary coil in order to ensure a very rapid build up or burn off of ice. This coil may conveniently be placed, as a spiral or as a series of vertical tubes, within the empty core of the element, provided it does not fill the core completely. Typically, a series of four or five one inch outer diameter tubes near the axis of the element will be sufficient for most purposes.

There are some new non-aqueous phase-change mediums being developed, and some of these will change phase between the liquid and solid states at very high temperatures. This can mean that in the event of a breakdown the phase change medium remains solid, and in this case it is necessary to include some heating elements around the exterior of the element or the sides of the reservoir to ensure that the solid mass of phase-change medium can be released.

It should be appreciated that the invention may be embodied in many other ways besides that described with reference to the preferred embodiment. In particular it should be realised that the element and heat exchanger could be manufactured from a wide variety of materials besides those mentioned, and it should also be appreciated that the configuration of the elements and heat exchanger may vary widely within the scope of the invention.

In particular, it should be appreciated that there is no reason why the coils could not be wound from the inside out; many other arrangements for the spacer and locking bars could be incorporated besides those mentioned. For example the spacer bars need not be arranged radially, but could be arranged in a grid, or even diametrically. Only one inlet and outlet manifold has been mentioned, but of course several could be included around the edge of the element, or in any other convenient places. The element as a whole may be constrained in a cage of many other designs than that shown. The element may be secured into the heat exchanger tank in many other ways than that preferred. The reservoir may be constructed in many other ways than that indicated. Heat exchangers need not use rigid tanks, and the walls of the tank need not be parallel, in which case the tanks can be moulded all in one piece. There is no reason why the heat exchange element need be of generally cylindrical shape penetrated by a cylindrical void, and it could be frusto-conical or any other convenient shape. The spirals need not be circular but could of course be oval, otherwise curved, or even rectilinear provided the corners were radiused to prevent the tubing from kinking.

I claim:
1. A method of manufacturing a heat exchanger element comprising the steps of:
   a) extruding a tube of deformable plastic material.
   b) winding the tube prior to curing to form a continuous spiral of tubing lying substantially in a plane;
   c) engaging the spiral of tubing along the length of at least one spacer bar in order to maintain the spacing of the spiral of tubing within said plane;
   d) disposing a plurality of spirals of tubing one above the other; and
   e) arranging one end of each spiral of tubing in communication with an inlet manifold and the other end in communication with an outlet manifold.

2. A method of manufacturing a heat exchanger element as claimed in claim 1, wherein the tube is extruded from polyethelyne pellets.

3. A method of manufacturing a heat exchanger element as claimed in claim 2, wherein the tube is wound onto a winding table while at a temperature between 40° and 60° C.

4. A method of manufacturing a heat exchanger element as claimed in claim 1, wherein once a complete spiral of tubing has been engaged along a spacer bar a locking bar is clipped over the top and initially engages the spacer bar in a manner which allows adjustment of the tubing.

5. A method of manufacturing a heat exchanger element as claimed in claim 4, wherein the locking bar is subsequently driven into an irreversible engagement which does not permit further movement of the tubing.

6. A method of manufacturing a heat exchanger element as claimed in claim 1, wherein the spirals are subsequently placed on a first rigid platform, around the edges of which rods extend in an upward direction, and a second rigid platform is connected to the tops of the rods.

7. A method of manufacturing a heat exchanger element as claimed in claim 1, wherein the spirals are preferably wound alternately clockwise and anti-clockwise, and arranged in pairs one above the other.

8. A method of manufacturing a heat exchanger element as claimed in claim 7, wherein the inner ends of each pair of spirals are connected together, the outer end of the lower spiral is connected to the inlet manifold and the outer end of the upper spiral is connected to the outlet manifold.

9. A method of manufacturing a heat exchanger element as claimed in claim 7, wherein the tubing of each spiral of a pair is cut along its length to form an inner and an outer portion of each spiral; and the inner portions and the outer portions of the pair are connected into separate circuits.

10. A method of manufacturing a heat exchanger comprising the steps of:
    (a) manufacturing a heat exchanger element according to any preceding claim, placing said element in a reservoir and then securing it to the reservoir.

11. A method of manufacturing a heat exchanger as claimed in claim 10, wherein said element is secured to the bottom of said reservoir.

12. A heat exchanger element of the type which exchanges heat between a fluid circulating in the element and a phase-change medium in a reservoir, the element comprising:
    a) a plurality of spirals of flexible tubing disposed one above the other, one end of each spiral being in communication with an inlet manifold and the other end in communication with on outlet manifold; and
    b) at least one spacer bar being notched along its length with notches of a size commensurate with the outer diameter of the tubes of said spirals such that each tube is engaged along the length of said spacer bar in order to maintain the tube in planar space relation.

13. A heat exchanger element as claimed in claim 12, wherein the bottom of the spacer bars are splayed.

14. A heat exchanger element as claimed in claim 12, wherein the element is supported on a first rigid platform, and vertical rods extend from around the edge of the first platform and connect with a second rigid platform placed above the element to create a rigid cage containing the flexible tubes.

15. A heat exchanger element as claimed in claim 12, wherein the spirals are wound alternately clockwise and anti-clockwise, and arranged in pairs one above the other.

16. A heat exchanger element as claimed in claim 15, wherein the inner end of each pair are connected together, the outer end of the lower spiral is connected to the inlet manifold, and the outer end of the upper spiral is connected to the outlet manifold.

17. A heat exchanger element as claimed in claim 15, wherein the tubing of each spiral of a pair is cut along its length to form an inner and outer portion of each spiral.

18. A heat exchanger element as claimed in claim 17, wherein the inner ends of the outer portions of the pair of spirals are connected together, the outer end of the outer portion of the lower spiral is connected to the inlet manifold, and the outer end of the outer portion of the upper spiral is connected to the outlet manifold; the inner ends of the inner portions of the pair of spirals are connected together, the outer end of the inner portion of the upper spiral is connected to the inlet manifold, and the outer end of the inner portion of the lower spiral is connected to the outlet manifold.

19. A heat exchanger comprising a reservoir into which is secured a heat exchange element according to claim 12.

20. A method of manufacturing a heat exchanger element comprising the steps of:
    a) extruding a tube of deformable plastic material;
    b) winding the tube by engaging the tube, prior to curing, along a length of at least one spacer bar while rotating the spacer bar to form a continuous spiral of tubing lying substantially in a plane;
    c) maintaining the planar spacing o the spiral tubing by said spacer bar;
    d) disposing a plurality of spirals of tubing in spaced relation to one another; and
    e) arranging the spirals of tubing in communication with an inlet and an outlet manifold.

* * * * *